(12) United States Patent
Davidson

(10) Patent No.: US 9,835,269 B2
(45) Date of Patent: Dec. 5, 2017

(54) PIPE SUPPORT SYSTEMS

(71) Applicant: JCCO 330 LIMITED, Manchester (GB)

(72) Inventor: Paul Davidson, Macclesfield (GB)

(73) Assignee: JCCO 330 LIMITED, Manchester (GB)

( * ) Notice: Subject to any disclaimer, the term of this patent is extended or adjusted under 35 U.S.C. 154(b) by 0 days.

(21) Appl. No.: 14/916,466

(22) PCT Filed: Jul. 22, 2014

(86) PCT No.: PCT/GB2014/052232
§ 371 (c)(1),
(2) Date: Mar. 3, 2016

(87) PCT Pub. No.: WO2015/033098
PCT Pub. Date: Mar. 12, 2015

(65) Prior Publication Data
US 2016/0208959 A1  Jul. 21, 2016

(30) Foreign Application Priority Data

Sep. 3, 2013  (GB) .................................. 1315666.6

(51) Int. Cl.
*F16L 3/00* (2006.01)
*F16L 3/11* (2006.01)
(Continued)

(52) U.S. Cl.
CPC . *F16L 3/00* (2013.01); *F16L 3/11* (2013.01); *F16L 3/133* (2013.01); *F16M 13/02* (2013.01); *F16M 13/027* (2013.01); *F16B 7/105* (2013.01)

(58) Field of Classification Search
USPC .......................................................... 248/58
See application file for complete search history.

(56) References Cited

U.S. PATENT DOCUMENTS 1,773,838 A * 8/1930 Zifferer .................... F16L 3/11
248/62
1,870,651 A * 8/1932 Robinson ................. F16L 3/11
248/59
(Continued)

FOREIGN PATENT DOCUMENTS

| CN | 1930398 A | 3/2007 |
| JP | 2000018436 A | 1/2000 |

OTHER PUBLICATIONS

International Search Report and Written Opinion for PCT/GB2014/052232, dated Sep. 29, 2014, 12 pages.
(Continued)

*Primary Examiner* — Monica Millner
(74) *Attorney, Agent, or Firm* — Hoffman Warnick LLC

(57) ABSTRACT

Disclosed is an apparatus for suspending an object from an anchor point positioned, in use, above it, comprising: an elongate rod (200) having at least one waisted portion (220); a rod-engaging member (400); and a lock member (300), wherein the rod-engaging member (400) comprises: a substantially cylindrical main body (410) having a longitudinal slot (460) running along its entire length; a circumferential ridge (420) disposed around the cylindrical main body (410), arranged to engage with a complementary recess (130) provided in the object to be suspended; and a portion (430) comprising at least one elongate element having an inwardly facing projection (470), arranged to engage with the waisted portion (220) of the elongate rod (200).

14 Claims, 6 Drawing Sheets

(51) Int. Cl.
*F16L 3/133* (2006.01)
*F16M 13/02* (2006.01)
*F16B 7/10* (2006.01)

(56) References Cited

U.S. PATENT DOCUMENTS

| | | | |
|---|---|---|---|
| 2,111,357 A * | 3/1938 | Cornell, Jr. | F16B 27/00 248/59 |
| 2,158,802 A * | 5/1939 | Redlon | F16L 3/133 248/62 |
| 3,170,664 A | 2/1965 | Carner | |
| 5,091,142 A | 2/1992 | Petit | |
| 5,366,191 A * | 11/1994 | Bekanich | A61M 5/1415 248/125.1 |
| 5,387,065 A | 2/1995 | Sullivan | |
| 2004/0091332 A1 | 5/2004 | Kuntze | |

OTHER PUBLICATIONS

Search Report for Application No. GB1315666.6, dated Mar. 10, 2014, 3 pages.

* cited by examiner

PIPE SUPPORT SYSTEMS

The present invention relates to apparatus for supporting pipe networks. It particularly relates to supporting pipes from a ceiling or a wall-mounted bracket.

It is common to run networks of pipes for carrying fluids from a ceiling or along a wall, using a system of brackets, mounting points and rods, connected between the pipe and the support. Such pipe networks are frequently found in basements, cellars, ceiling voids and the like. The pipes in question may be used for conveying water, waste, gas or any other fluid which needs to be carried from one point to another in a building.

In the prior art, pipe support brackets are attached around a pipe and a coupling point located at the top of the bracket is connected to a length of threaded rod which is screwed into the bracket at a first end, and to a support point at a second end. The support point may be in the form of an anchor provided in a ceiling or in the form of a bracket extending from a wall. The anchor in the ceiling may be a specific fastener which is permanently installed in the ceiling, or may be in the form of an attachment to a rail system.

A particular problem in installing prior art pipe support or hanging systems is that work is performed overhead, which can be strenuous and awkward. The threaded rods which are routinely used to couple the pipe bracket to the support structure require cutting to length using a hacksaw, which often results in sharp portions remaining which can pose an injury risk to an installer. Screwing in the rods and adding locking bolts is time consuming and awkward.

It is an aim of embodiments of the present invention to address shortcomings in the prior art, whether mentioned herein or not.

According to the present invention there is provided an apparatus and method as set forth in the appended claims. Other features of the invention will be apparent from the dependent claims, and the description which follows.

For a better understanding of the invention, and to show how embodiments of the same may be carried into effect, reference will now be made, by way of example, to the accompanying diagrammatic drawings in which.

Figure 1:
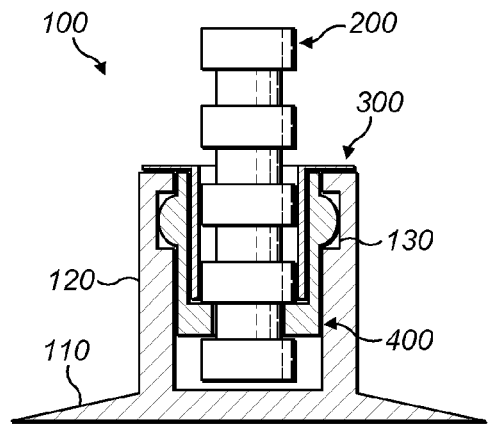
FIG. 1 shows a support coupling according to an embodiment of the present invention.
Figure 2:
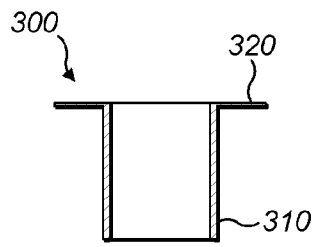
FIG. 2 shows a lock member according to an embodiment of the present invention.
Figure 3:
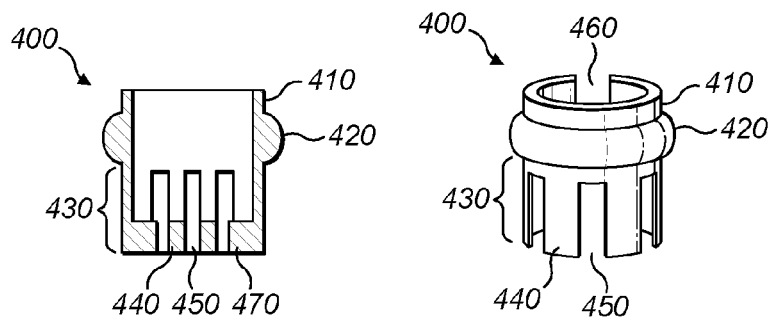
FIG. 3 shows a partial cross-section and perspective view of a rod engaging member according to an embodiment of the present invention.
Figure 4:
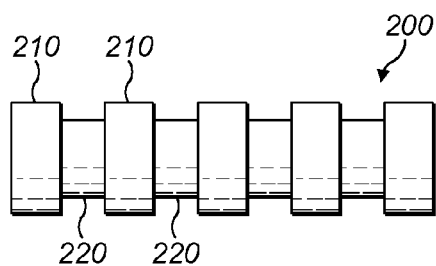
FIG. 4 shows a view of a rod with waisted portions according to an embodiment of the present invention.

FIG. 1 shows a support coupling 100 according to an embodiment of the present invention. FIGS. 2-4 show some of the component parts separately. Pipe support bracket 110 is not shown completely, as this is well known to the skilled person. It is simply two semi-circular components arranged to surround a pipe, with each component having a flange extending therefrom to allow a fastening to be used to couple the two components together. Such brackets are well known and in common usage in the art, so further details are not presented here.

Extending from pipe bracket 110 is a boss 120, in the form of a hollow cylinder, open at an upper end and having disposed around its internal wall a recessed portion 130, extending completely around the internal wall.

The components which co-operate with the boss 120 to form the coupling include a waisted rod 200, a rod engaging member 300 and a lock member 300.

The waisted rod is formed from a plastics material or a metal, as required in the particular circumstances of use. A plastics material is particularly preferred since it offers benefits in terms of installation.

The waisted rod 200 may be provided in various lengths or a single extended length which can be cut or broken as needed to give the required length for a particular task. 'Waisted' in this context refers to the structure of the rod which comprises a plurality of portions 210 having a first diameter and a plurality of portions 220 having a second diameter, smaller than the first. The first and second portions alternate and give the rod a castellated appearance.

If a shorter length of rod 200 is required, it may simply be broken to the desired length, since the portions 220 define an area of weakness such that a neat break can be achieved through a simple snapping action. This, of course, applies to rods formed from plastics materials; metal rods will require a tool to be used—either a hacksaw of wire cutters/pliers, as required.

As an alternative, the waisted rod may be provided in a defined length, with only a single waisted portion, i.e. a single second portion 220. This may be useful in circumstances where a desired length is known in advance. In order to couple such a rod, a single waisted portion may be provided at each end of the rod.

The next stage in the assembly involves fitting the rod engaging member 400 to the end of the rod which is to be fitted to the boss 120. Rod engaging member comprises a generally cylindrical member 410, which has a longitudinal slot 460 running completely from a top to a bottom of the cylinder. Viewed from above, the outline of the member 400 is substantially C-shaped.

Running around the exterior of the member 400 is a ridge 420. This has a substantially curved profile, for reasons which will be explained shortly. The ridge 420 is locate adjacent an upper part of the member.

Beneath the ridge, the lower portion 430 comprises a plurality of elongate members 440 separated by slits 450. Each of the elongate members 440 is terminated in an inwardly-facing projection 470. Note that this has been omitted from the perspective view of the member, for clarity reasons, but is clearly visible in FIG. 1 and the partial cross-sectional view of FIG. 3. It is possible to achieve the benefits of the invention if only a single elongate member 440 is provided with an inwardly facing projection, but better performance is experienced if a plurality of such features are provided.

The longitudinal slot 460 provided in the member allows pressure to be applied to the member so as to close the slot 460 and thus reduce the overall circumference or diameter of the member.

The member 400 is placed over the rod 200. In its normal state (i.e. with no external pressure applied), the member 400 does not slide easily over the rod, since the aperture formed by the plurality of inwardly-facing projections 470 is too small to allow the first portions 210 of the rod to pass through. Therefore, the slot 460 must be slightly increased in size, manually, to allow the member 400 to be positioned as required on the rod. The member will then stay in place with the projections 470 engaging one of the second portions 220, as shown in FIG. 1.

The lower end 430 of member and rod 200 are next inserted into the boss 120. The diameter of the member 400 allows a close but easy fit into the boss. Once the ridge 420 encounters the upper edge of the boss, continued pressure to push the rod into the boss causes the slot 460 to close, allowing the ridge 420 to enter the boss. Further continued pressure causes the ridge 420 to enter the recess 130 in the interior wall of the boss and the slot 460 re-opens, allowing the member 400 to assume its normal shape and size, which is substantially identical to its shape and size before entering the boss.

The curved profile of the ridge 420 allows it to act as a cam once it encounters the outer edge of the boss 120, and similarly to act as a cam if the member 400 needs to be removed from the boss.

The final stage in the assembly requires lock member 300 to be fitted, to prevent accidental slippage of the rod 200 and member 400, which could result in the assembly coming apart.

Lock member 300 comprises a hollow cylinder 310, open at both ends, and a radially extending flange 320, formed at one end of the cylinder. The lock member resembles a top-hat with an open upper surface.

The lock member is fitted so that it sits between the rod engaging member 400 and the rod 200, with the flange 320 sitting atop the boss 120. With the lock member 300 in this position, it is not possible to disassemble the assembly 100, since the rod engaging member 400 cannot be compressed and ridge 420 is forced to occupy the recess 130.

Lock member 300 is dimensioned such that an interference fit is provided between it and the member 400. It must be forcibly pressed into position and the friction between it and the member 400 and/or rod 200 keeps it in position. It can, though, be removed by levering it out of position by inserting a screwdriver between the flange 320 and the boss 120.

The foregoing explains how an assembly 100 is formed for use at the pie bracket 110, but the same principle may be employed at the other end of the pipe hanging system i.e. at the ceiling or bracket, to which the pipe bracket is connected by rod 200.

Figure 5:
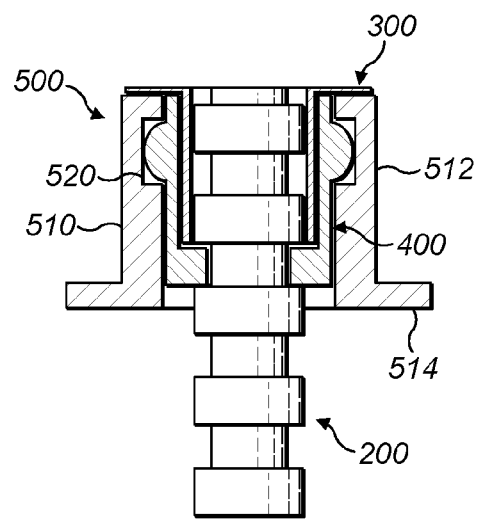
FIG. 5 shows a form of support coupling according to another embodiment of the present invention.
Figure 6:
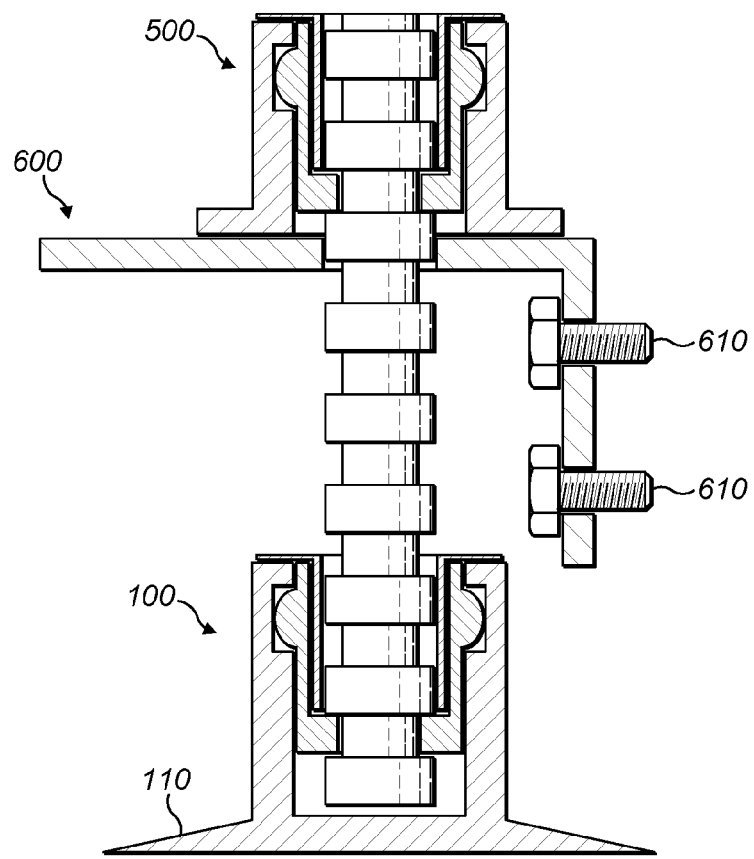
FIG. 6 shows a complete support system, comprising the support couplings of FIGS. 1 and 5.

FIG. 5 shows a support coupling suitable for coupling a hanging assembly to a bracket. FIG. 6 shows the assembly of FIG. 5, securing the uppermost portion of the assembly to a bracket 600, with the assembly 100 of FIG. 1 at the lowermost portion of the assembly.

The support assembly of FIG. 5 is essentially identical with the assembly 100 already described except that instead of coupling to a boss 120 on the pipe bracket 110, use is made of a collar 510, which shares many of the functional features of boss 120.

Collar 510 resembles lock member 300 in that it comprises an open cylindrical portion 512 having a radially extending flange 514 at one end thereof. Like the boss 120, there is a recess 520 provided on an internal surface of the collar. Its function is identical to recess 130.

In order to assemble the uppermost support assembly 500, use is made of a bracket 600, which has been pre-installed on a wall or other support structure, such as a pillar. It is securely fastened in place using one or more fixings, such as screws or bolts 610.

Typically, the uppermost support assembly 500 would be assembled before the lowermost assembly 100, although this can vary if required.

Firstly, the rod 200 is passed through an aperture in the bracket. Then, rod engaging member 400 is attached to rod 200 as previously described. The next step requires collar 500 to be slid over rod engaging member 400, such that ridge 420 enters recess 520, as previously described. The flange 514 of collar 500 is arranged to rest on the upper surface of bracket 600. The flange 514 is dimensioned such that it is larger than the aperture in the bracket, so that the uppermost assembly 500 is properly retained and does not slip through the aperture.

In order to secure the uppermost assembly 500, lock member 300 is inserted into the free end of the collar 500 so that ridge 420 is forced to remain in recess 520.

Once the uppermost assembly has been secured, the lowermost assembly can be completed as set out previously and the pipe hanging system is then ready to receive a pipe in bracket 110.

Instead of brackets, it is possible and sometimes necessary to suspend pipes directly from a ceiling. In such cases, some form of fitting is required to secure the rod 200 at its uppermost end.

Figure 7:
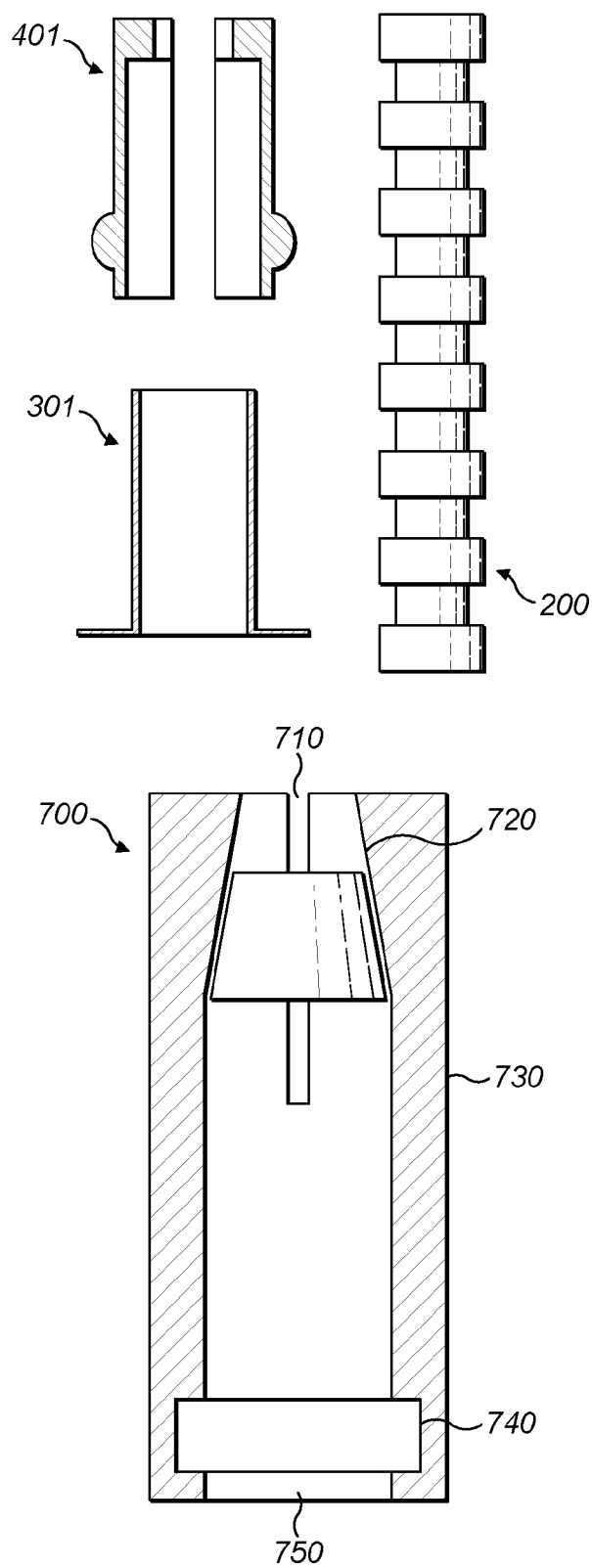
FIG. 7 shows components of a support system for anchoring into a fixed surface.

FIG. 7 shows an embodiment of the invention which may be used in such circumstances. It comprises an anchor 700, a waisted rod 200, rod engagement member 401 and lock member 301. Rod engagement member 301 and lock member 401 are functionally identical to the corresponding parts 300, 400 shown previously, but have slightly different dimensions.

Anchor 700 is intended to be inserted into a pre-drilled aperture in a ceiling. It is formed from steel or another suitable metal. It is essentially a hollow cylinder, open at each end. At end 750, which is intended to be accessible as the opening to the anchor, once inserted, there is provided a recess 740. The function of this recess is identical to the function of recesses 130 and 520 already described.

At the opposite end to end 750, there is provided an internal tapered section, whereby the internal diameter of the anchor reduces towards the end. Also provided are a plurality of longitudinal slots 710 which extend along part of the length of the anchor. Positioned in the cavity of the anchor is a drift 730, which is frustro-conical in shape. Once the anchor is positioned in the aperture, it is necessary to drive the drift 730 further into the anchor. This can be done by inserting a suitable tool into the anchor and driving the drift with a hammer or mallet. This has the effect of forcing the tapered section 720 to splay outwards and so secures the anchor 700 firmly into position.

Figure 8:
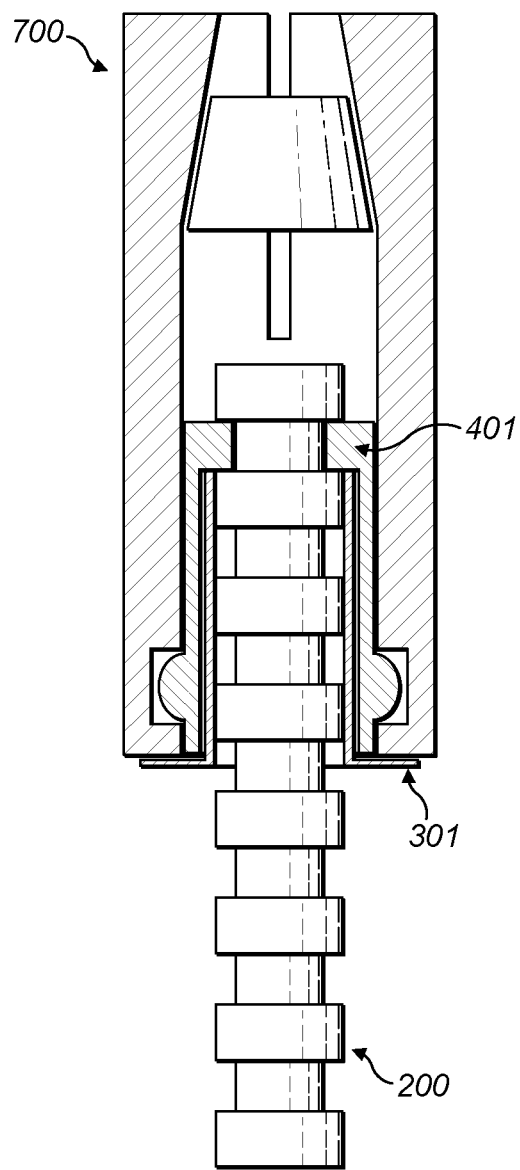
FIG. 8 shows the components of FIG. 7 assembled.

Once the anchor 700 is firmly secured, the rod 200, rod engagement member 401 and lock member 301 can be assembled and the uppermost support coupling is complete. The assembly process is substantially identical to that described previously, and results in a completed assembly as shown in FIG. 8.

FIGS. 9 to 12 shows the assembly steps involved with a further embodiment of the present invention. The main difference between the embodiment shown in FIGS. 9 to 12 is that the rod engaging member 402 has two ridges 420, arranged to engage with two recesses 740 provided in anchor 701. In all other respects, this embodiment operates the same as the embodiment shown previously in FIGS. 7 and 8.

Figure 9:
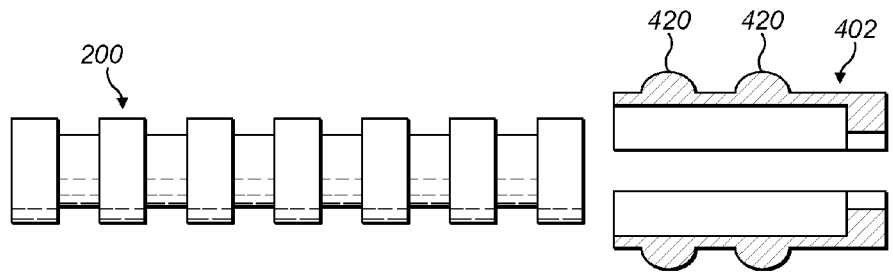
FIGS. 9 to 12 shows the steps in the assembly of a anchored support system according to an embodiment of the present invention.

FIG. 9 shows how the rod 200 is introduced into rod engaging member 402.

Figure 10:
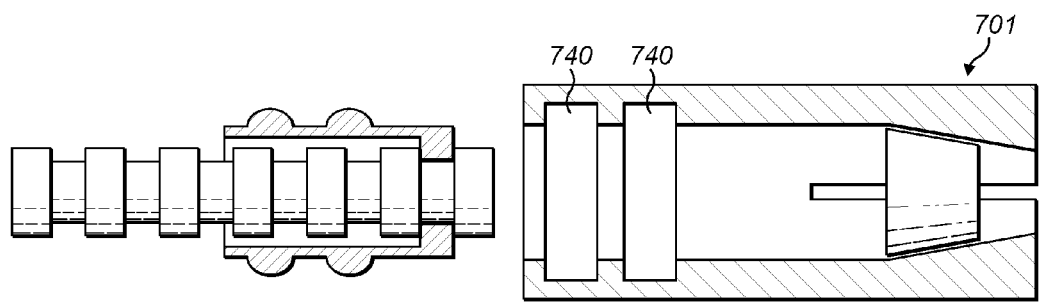
Figure 11:
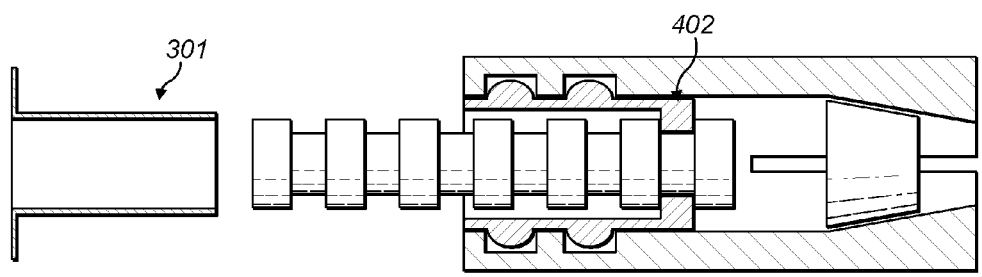

FIG. 10 shows how this combination of rod 200 and member 402 is introduced into anchor 701, which has previously been securely driven into a ceiling. The rod 200 and member 402 combination is pushed into the anchor until both ridges 420 have engaged with both recesses 740, as shown in FIG. 11. Lock member 301 is then slid along the rod 200 so that the member 402 cannot work loose. Simple finger pressure is enough to ensure that lock member 301 says firmly in position.

Figure 12:
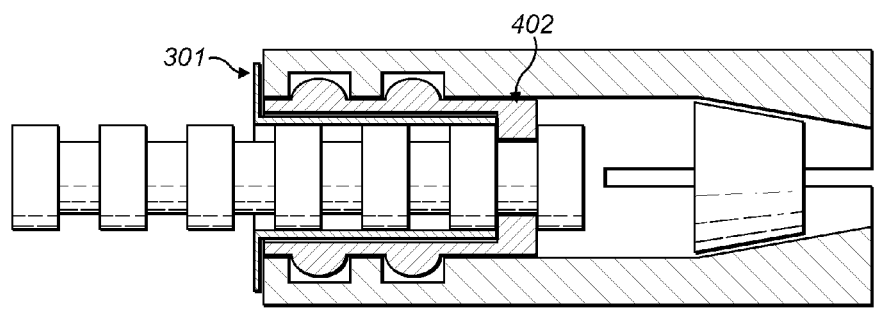
Figure 13:
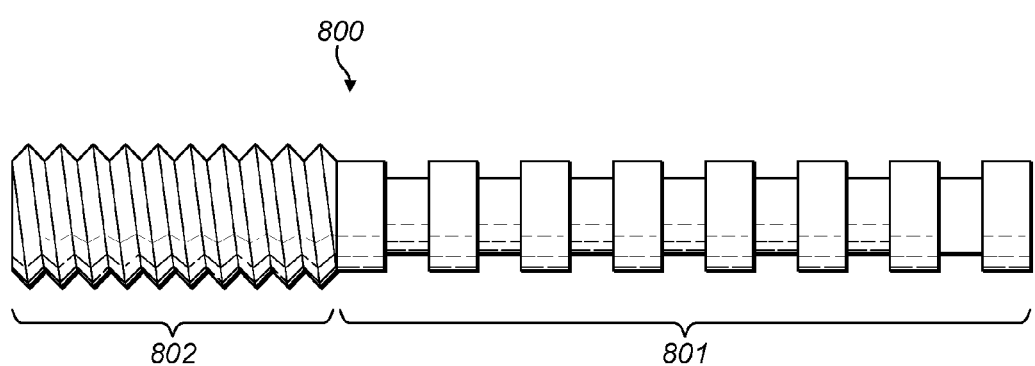
FIG. 13 shows a hybrid rod according to an embodiment of the present invention.

FIG. 12 shows the completed assembly.

In some circumstances, it is necessary to make use of an existing anchor point and, for such installations, hybrid rod 800 may be used. Hybrid rod 800 comprises a threaded portion 802 for attachment to a pre-existing anchor point. It also comprises a waisted portion 801, which is substantially identical to threaded rod 200, already described.

Hybrid rod 800 may be formed from a plastics material or a suitable metal, such as steel. Once the threaded end is coupled to an anchor point, then the waisted portion 801 may be coupled in the same manner as the support coupling shown in FIG. 1.

As can be seen from the preceding description, there is provided a simple and reliable means of providing pipe support structures. The support couplings described may have a variety of other uses and the example of pipe hanging systems is intended to be exemplary only.

Embodiments of the invention do not require any awkward screwing action, and rely on easy to assemble parts, which can be conveniently made to any desired size without leaving sharp residues behind.

By use of embodiments of the present invention, it is possible to quickly install a pipe hanging system, since it requires fewer awkward above-head actions and so enables a system to be set up is a significantly shorter time than is possible using prior art pipe hanging techniques.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Apparatus for suspending an object from an anchor point positioned, in use, above it, comprising:
   an elongate rod having a plurality of waisted portions, wherein the plurality of waisted portions comprises alternating first and second portions having different diameters such that the second portions define an area of weakness;
   a rod-engaging member comprising a substantially cylindrical main body having a longitudinal slot running along its entire length, the longitudinal slot allowing, in use, pressure to be applied to the rod-engaging member so as to close the longitudinal slot and thus reduce an overall circumference or diameter of the rod-engaging member;
   a circumferential ridge disposed around the cylindrical main body, arranged to engage with a complementary recess provided in the object to be suspended;
   a portion comprising at least one elongate element having an inwardly facing projection, arranged to engage with one of the plurality of waisted portions of the elongate rod; and
   a lock member comprising a hollow cylinder open at both ends, arranged to sit between the rod-engaging member and the elongate rod to prevent the circumferential ridge from departing the complementary recess in the object to be suspended.

2. Apparatus as claimed in claim 1 wherein the lock member includes a radially extending flange at one end of the hollow cylinder.

3. Apparatus as claimed in claim 1 wherein the rod-engaging member comprises a plurality of elongate elements, each having an inwardly facing projection, arranged to engage with at least one of the plurality of waisted portions.

4. Apparatus as claimed in claim 1 wherein the object to be suspended is a pipe bracket, and the pipe bracket comprises a boss extending therefrom, the boss being in the form of a hollow cylinder with the complementary recess provided therein.

5. Apparatus as claimed in claim 1 further comprising an anchor point.

6. Apparatus as claimed in claim 5 wherein the anchor point comprises:
   a bracket, having an aperture therein, wherein the elongate rod is arranged to pass therethrough;
   a collar, which is arranged to be positioned, in use, above the bracket;
   a further rod-engaging member; and
   a further lock member,
wherein the further rod-engaging member comprises:
   a substantially cylindrical main body having a longitudinal slot running along its entire length;
   a circumferential ridge disposed around the cylindrical main body, arranged to engage with a complementary recess provided in the collar; and
   a portion comprising at least one elongate element having an inwardly facing projection, arranged to engage with the waisted portion of the elongate rod.

7. Apparatus as claimed in claim 5 wherein the anchor point comprises:
   a substantially cylindrical shell arranged to be inserted into an aperture in a support surface;
   a further rod-engaging member; and
   a further lock member,
wherein the further rod-engaging member comprises:
   a substantially cylindrical main body having a longitudinal slot running along its entire length;
   a circumferential ridge disposed around the cylindrical main body, arranged to engage with a complementary recess provided in the shell; and a portion comprising at least one elongate element having an inwardly facing projection, arranged to engage with the waisted portion of the elongate rod.

8. Apparatus as claimed in claim 6 wherein the further lock member is arranged to be located between the elongate rod and the rod engaging member to prevent the circumferential ridge from departing the complementary recess.

9. Apparatus as claimed in claim 1 wherein the rod-engaging member comprises a plurality of circumferential ridges to engage with a corresponding plurality of complementary recesses.

10. An apparatus as claimed in claim 7, wherein the further lock member is arranged to be located between the elongate rod and the rod engaging member to prevent the circumferential ridge from departing the complementary recess.

11. Apparatus for suspending an object from an anchor point positioned, in use, above it, comprising:
    an elongate rod having at least one waisted portion;
    a rod-engaging member comprising:
        a substantially cylindrical main body having a longitudinal slot running along its entire length;
        a circumferential ridge disposed around the cylindrical main body, arranged to engage with a complementary recess provided in the object to be suspended; and
        a portion comprising at least one elongate element having an inwardly facing projection, arranged to engage with the waisted portion of the elongate rod;
    a lock member; and
    an anchor point comprising:
        a bracket, having an aperture therein, wherein the elongate rod is arranged to pass therethrough;
        a collar, which is arranged to be positioned, in use, above the bracket;
        a further rod-engaging member; and
        a further lock member,
    wherein the further rod-engaging member comprises:
        a substantially cylindrical main body having a longitudinal slot running along its entire length;
        a circumferential ridge disposed around the cylindrical main body, arranged to engage with a complementary recess provided in the collar; and
        a portion comprising at least one elongate element having an inwardly facing projection, arranged to engage with the waisted portion of the elongate rod.

12. The apparatus of claim 11, wherein the lock member is arranged to be located between the elongate rod and the rod engaging member to prevent the circumferential ridge from departing the complementary recess.

13. An apparatus for suspending an object from an anchor point positioned, in use, above it, comprising:
    an elongate rod having at least one waisted portion;
    a rod-engaging member comprising:
        a substantially cylindrical main body having a longitudinal slot running along its entire length;
        a circumferential ridge disposed around the cylindrical main body, arranged to engage with a complementary recess provided in the object to be suspended; and
        a portion comprising at least one elongate element having an inwardly facing projection, arranged to engage with the waisted portion of the elongate rod;
    a lock member; and
    an anchor point comprising:
        a substantially cylindrical shell arranged to be inserted into an aperture in a support surface;
        a further rod-engaging member; and
        a further lock member,
    wherein the further rod-engaging member comprises:
        a substantially cylindrical main body having a longitudinal slot running along its entire length;
        a circumferential ridge disposed around the cylindrical main body, arranged to engage with a complementary recess provided in the shell; and
        a portion comprising at least one elongate element having an inwardly facing projection, arranged to engage with the waisted portion of the elongate rod.

14. The apparatus of claim 13, wherein the lock member is arranged to be located between the elongate rod and the rod engaging member to prevent the circumferential ridge from departing the complementary recess.

* * * * *